United States Patent [19]

Hayakawa

[11] Patent Number: 4,593,329
[45] Date of Patent: Jun. 3, 1986

[54] MAGNETIC DATA STORAGE APPARATUS HAVING A MAGNETIC DISK NORMALLY IN CONTACT WITH A TRANSDUCER HEAD, AND METHOD OF OPERATION

[75] Inventor: Yuji Hayakawa, Nagoya, Japan
[73] Assignee: Teac Corporation, Tokyo, Japan
[21] Appl. No.: 690,539
[22] Filed: Jan. 11, 1985
[30] Foreign Application Priority Data
  Jan. 23, 1984 [JP] Japan .................. 59-10796
[51] Int. Cl.⁴ ............................ G11B 5/55
[52] U.S. Cl. .......................... 360/75; 360/78
[58] Field of Search ............... 360/75, 77, 78
[56] References Cited
  U.S. PATENT DOCUMENTS
  4,007,492  2/1977  Rose ........................... 360/75
  4,139,874  2/1979  Shiraishi ..................... 360/86
  4,194,226  3/1980  Kaseta et al. ............... 360/106
  4,396,959  8/1983  Harrison et al. ............ 360/77

*Primary Examiner*—George G. Stellar
*Attorney, Agent, or Firm*—Woodcock Washburn Kurtz Mackiewicz & Norris

[57] ABSTRACT

A magnetic data storage apparatus such as a Winchester disk drive is disclosed wherein a transducer head or heads are normally held in contact with a magnetic disk or disks and move out of contact therewith for data transfer when the disk or disks are set into rotation. In order to preclude the possibility of the transducer head destroying the series of concentric data storage tracks on the magnetic disk, the head is normally retained on a head landing track formed on the disk, preferably radially inwardly of the data storage tracks. When the disk is set into rotation, the head is transported to a position over a desired one of the data storage tracks for the commencement of data transfer only after it has moved out of contact with the head landing track. Upon completion of each run of data transfer, the head is returned to a position over the head landing track for landing thereon when the disk is set out of rotation. The head return to the head landing track is effected by computing the difference between the addresses of the head landing track and of that one of the data storage tracks which the head accessed for the last time, and by delivering the corresponding number of pulses to a stepping motor included in the head transport mechanism.

5 Claims, 6 Drawing Figures

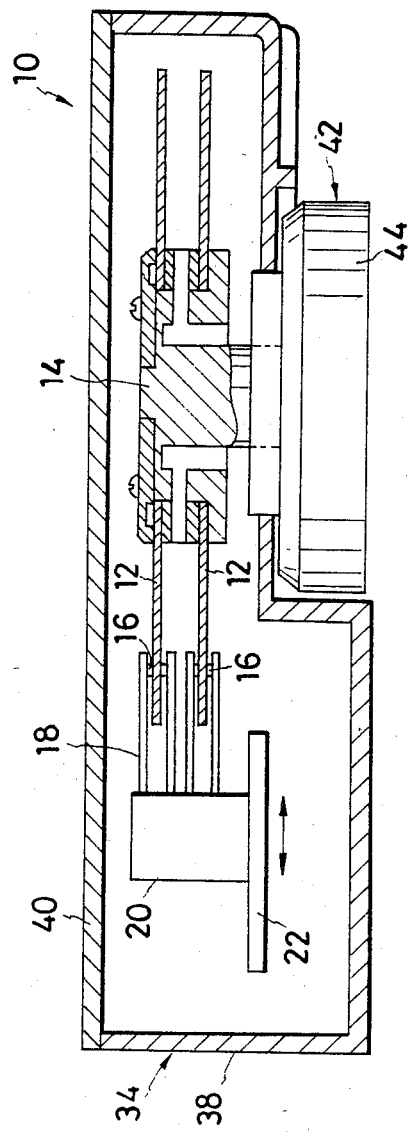
FIG. 2
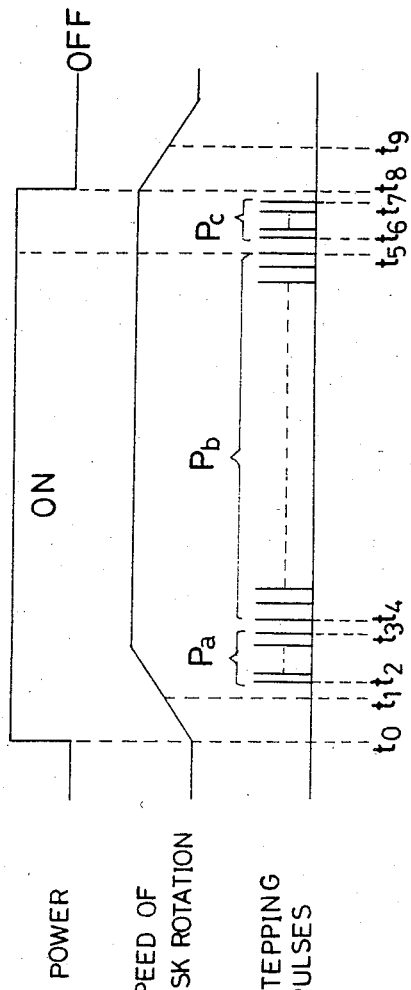
FIG. 4A  POWER
FIG. 4B  SPEED OF DISK ROTATION
FIG. 4C  STEPPING PULSES

MAGNETIC DATA STORAGE APPARATUS HAVING A MAGNETIC DISK NORMALLY IN CONTACT WITH A TRANSDUCER HEAD, AND METHOD OF OPERATION

BACKGROUND OF THE INVENTION

My invention relates to data transfer apparatus employing magnetic disks as data storage media, and more specifically to such apparatus of the kind known as a Winchester drive wherein a magnetic disk is fixed to a drive spindle and is normally held in contact with a transducer head, the latter moving out of contact with the disk upon rotation thereof for data transfer. My invention is also specifically directed to a method of operation for such magnetic data transfer apparatus.

In a Winchester disk drive, as is well known, a rigid magnetic disk or disks and an associated transducer head or heads are semipermanently enclosed in a dustproof housing for data transfer in a dustfree environment. The disk or disks are firmly mounted on a drive spindle, and the head or heads are biased into contact with the disk or disks when the latter are out of rotation. When the disk or disks are set into rotation and pick up speed to, say, 1500 revolutions per minute (rpm), streams of air created thereby cause the head or heads to move out of contact therewith. The head or heads transfer data to or from the revolving disk or disks while being thus spaced, normally from 0.4 to 0.5 microns, therefrom.

The Winchester drives as so far constructed as above have been susceptible to shocks or vibrations as the transducer head or heads are normally in contact with the magnetic disk or disks. At the time of shipment, therefore, the Winchester drives have had to be enclosed in shockproof packages. The added costs for such packaging and shipping of the Winchester drives have not been negligible for their manufacturers and dealers and, in consequence, for their purchasers. After being unpackaged, too, the Winchester drives have demanded careful handling so as not to give damage to the contacting disks and heads.

A problem has also existed in the operation of the Winchester drives. When the disk or disks are set into rotation for data transfer, the head or heads slide thereover until they pneumatically move apart therefrom upon increase in the revolving speed of the disk or disks to 1500 rpm or so. Such sliding of the head or heads over the disk or disks also takes place when the revolving speed of the disk or disks falls below 1500 rpm upon completion of the data transfer. There has been a high likelihood of the head or heads destroying the data storage tracks of the disk or disks while thus sliding thereover at the start and end of each run of data transfer.

SUMMARY OF THE INVENTION

I have hereby discovered how to avoid damage to the data storage tracks of a magnetic disk by a transducer head in magnetic data storage apparatus of the kind specified.

Briefly summarized in one aspect thereof, my invention provides a magnetic data storage apparatus comprising a magnetic disk which has, in addition to the usual data storage tracks, a head landing track where no data are to be written. A magnetic transducer head for data transfer with the magnetic disk is supported by support means and is thereby biased into contact with the magnetic disk when the latter is out of rotation. When the magnetic disk is set into rotation at more than a predetermined speed, the transducer head pneumatically moves out of contact with the magnetic disk against the bias of the support means. While being thus held spaced from the magnetic disk, the transducer head is moved more or less radially of the magnetic disk by head transport means for accessing the individual data storage tracks and head landing track on the disk. The apparatus further comprises control means acting on the head transport means so as to cause the same to return the transducer head to a position over the head landing track on the magnetic disk after the moment of completion of each run of data transfer between the magnetic disk and the transducer head and before the moment when the speed of rotation of the magnetic disk falls below the predetermined speed.

Accordingly, the transducer head lands on the head landing track on the magnetic disk under the bias of the support means when the magnetic disk is set out of rotation, thereby avoiding contact with, and possible damage to, the data storage tracks on the disk. Moreover, at the beginning and end of each run of data transfer, the transducer head slides only over the head landing track when the magnetic disk is in rotation at less than the predetermined speed.

An additional advantage of my invention is that its teachings are readily practicable. In a preferred embodiment, the data storage tracks and head landing track are concentric, with the latter arranged radially inwardly of the former. The tracks are individually addressable. The transducer head may therefore be returned to the head landing track upon completion of data transfer by the head transport means much the same way as it moves the head from one data storage track to another for track to track accessing during data transfer.

According to another aspect of my invention, there is provided a method of operation for the magnetic data storage apparatus of the type in question. The method comprises moving the transducer head, upon completion of data transfer with the magnetic disk, to a position over the head landing track on the disk while the latter is still in rotation at more than the predetermined speed at which the head pneumatically moves out of contact with the disk. The speed of rotation of the disk is allowed to fall below the predetermined value only after the transducer head has been moved to the position over the head landing track, thereby causing the head to land on the head landing track.

Preferably, at the beginning of data transfer, the transducer head is moved from over the head landing track to a position over a desired data storage track only after having been pneumatically moved out of contact with the magnetic disk.

For returning the transducer head to the head landing track according to a more specific aspect of the inventive method, there may first be computed the difference between the addresses of the head landing track and that one of the data storage tracks to which the head had access upon completion of data transfer. Then, while the disk is still in rotation at more than the predetermined speed, the number of stepping pulses corresponding to the above computed difference may be delivered to the stepping motor of the head transport mechanism, thereby causing the same to return the head to the position over the head landing track before the head makes contact with the disk.

The above and other features and advantages of my invention and the manner of realizing them will become more apparent, and the invention itself will best be understood, from a study of the following description and appended claims, with reference had to the attached drawings showing a preferred embodiment of my invention.

BRIEF DESCRIPTION OF THE DRAWINGS

FIG. 2 is a section through the Winchester drive, taken along the line II—II in FIG. 1 and shown complete with the top cover;

FIGS. 4A through 4C are waveform diagrams which are of use in explaining the operation of the circuitry of FIG. 3.

DESCRIPTION OF THE PREFERRED EMBODIMENT

Figure 1:
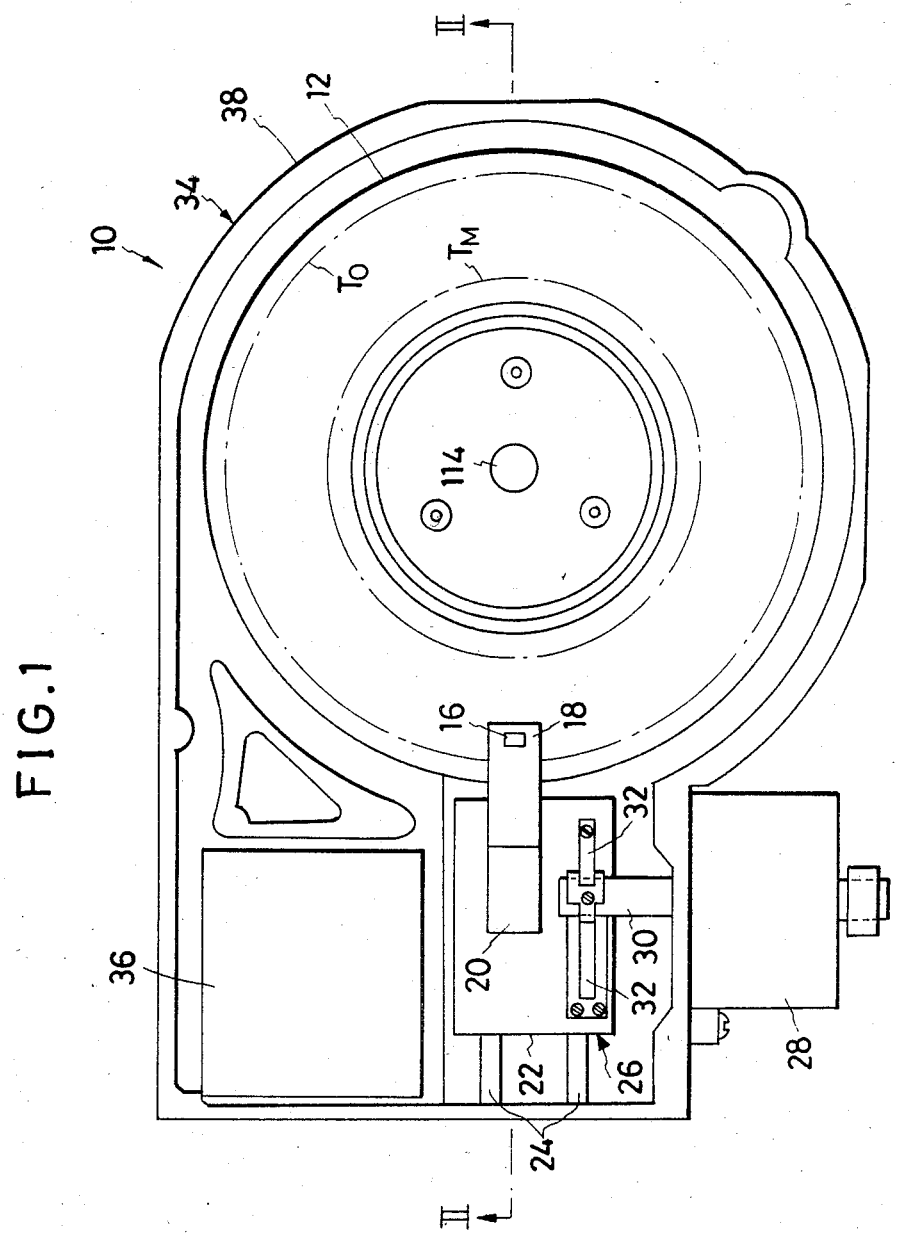
FIG. 1 is a plan view of a Winchester disk drive embodying the novel concepts of my invention, the Winchester drive being shown with its top cover removed to reveal the inner details.

My invention finds a typical application in Winchester disk drives such as that illustrated in FIGS. 1 and 2 and therein generally designated 10. The exemplified Winchester drive 10 has two rigid magnetic disks 12 coaxially mounted on a drive spindle 14 for joint rotation therewith. Each magnetic disk 12 is double sided; that is, both of its opposite faces are used for storing data. Thus a pair of magnetic transducer heads 16 are disposed on the opposite sides of each magnetic disk 12. In its simplest form, however, the data transfer apparatus in accordance with my invention may have but one magnetic disk, and only one of its opposite faces may be put to data transfer with a single transducer head.

The two pairs of transducer heads 16 are carried by respective support arms 18 which, in fact, are cantilever springs, each having one end affixed to a column 20 on a carriage 22. This carriage is movable along a pair of guide rails 24 for transporting the two pairs of transducer heads 16 more or less radially of the two coaxial magnetic disks 12 on the drive spindle 14.

Normally, or when the magnetic disks 12 are out of rotation, the support arms 18 bias the two pairs of transducer heads 16 into contact with the opposite faces of the respective magnetic disks. When the magnetic disks 12 are set into rotation, the airstreams created thereby cause the transducer heads 16 to move out of contact therewith against the bias of the support arms 18 as the rotative speed of the disks reaches 1500 rpm or thereabouts. Further, in the normal speed range (e.g. from 3000 to 3600 rpm) of the disks 12, the transducer heads 16 are pneumatically held spaced from 0.4 to 0.5 microns or so from the disks for magnetic data transfer therewith. It is to be understood that the support arms 18 are shown simplified, as the complex shape which these arms may have in practice is not essential for an understanding of my invention.

Employed for feeding the transducer heads 16 radially of the magnetic disks 12 for track to track accessing is a head transport mechanism 26 including a bidirectional electric motor 28 of the known stepping type. The stepping motor 28 has an output shaft 30 coupled to the carriage 22 via an alpha wound steel belt 32 of conventional design which functions to translate the bidirectional rotation of the stepping motor output shaft 30 into into the linear reciprocation of the carriage 22 and hence of the two pairs of transducer heads 16.

The noted magnetic disks 12, transducer heads 16, and all but the stepping motor 28 of the head transport mechanism 26 are all accommodated in a generally boxlike, dustproof housing 34. A filter 36 is also mounted within the housing 34. This housing has a major boxlike portion 38, and a top cover 40 (not shown in FIG. 1) hermetically closing the open top of the major portion. Seen under the bottom of the housing 34 in FIG. 2 is an electric motor 42 of the direct drive variety for directly driving the drive spindle 14 and thence the magnetic disks 12. The disk drive motor 40 has its rotor 44 arranged exteriorly.

Figure 3:
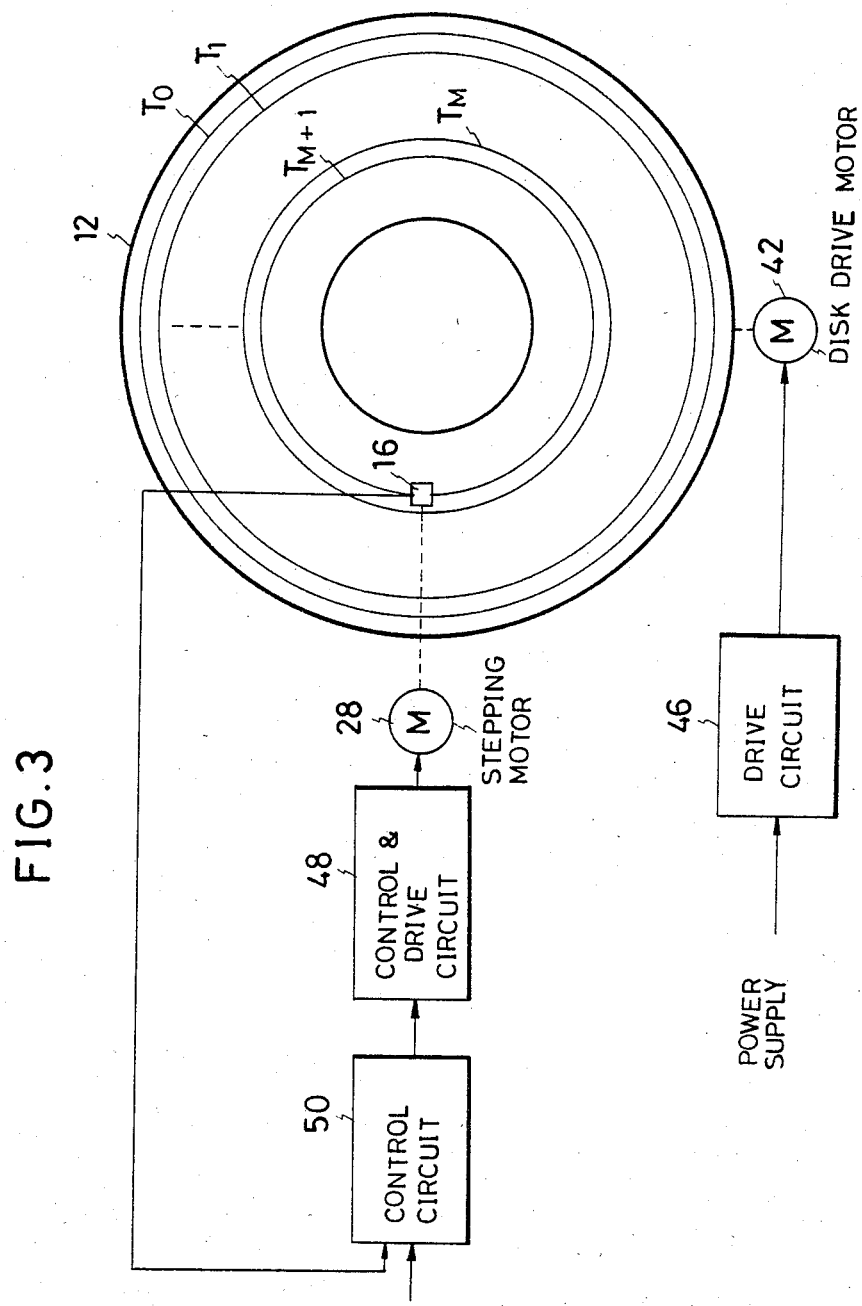
FIG. 3 is a block diagram of electric circuitry for imparting rotation to the two magnetic disks of the Winchester drive of FIG. 1 and for feeding its two pairs of magnetic transducer heads radially of the magnetic disks, the circuitry being shown together with one of the magnetic disks on which the data storage tracks and head landing track are illustrated schematically.

As will be seen from both FIGS. 1 and 3, each magnetic disk 12 has a series of individually addressable data storage tracks formed concentrically on each face thereof for storing data to be read by, or written from, the associated transducer head 16. The data storage tracks are designated, from the outermost one inward, $T_0, T_1, \ldots T_M$, M being 305, for example. Further, in accordance with my invention, an additional track designated $T_{M+1}$ is provided radially inwardly of the data storage tracks $T_0$ through $T_M$ in a concentric relation therewith. The track $T_{M+1}$ is what I call the head landing track, where no data are to be stored but where the associated transducer head 16 is to be held landed when the magnetic disk 12 is out of rotation. All the tracks have their addresses recorded thereon in accordance with a prescribed format.

FIG. 3 further indicates that the disk drive motor 42 is connected to, and energized by, a drive circuit 46 which in turn is connected to a suitable power supply. The disk drive motor 42 may be set into rotation as the power switch, not shown, of the data transfer system including the Winchester drive 10 is closed, and may be set out of rotation when the unshown power switch is opened.

As shown also in FIG. 3, the stepping motor 28 of the head transport mechanism 26 is connected to a control and drive circuit 48 and thence to a control circuit 50. In practice, the Winchester drive 10 is a slave unit under the control of master equipment comprising a central processor unit (CPU). The control circuit 48 can be nothing but this master equipment additionally programmed to return the transducer heads 16 to the head landing tracks $T_{M+1}$ on the respective magnetic disks 12 upon completion of each run of data transfer. During the normal process of data transfer, the control circuit 50 delivers to the control and drive circuit 48 stepping pulses and a direction signal thereby causing the same to energize the stepping motor 28 so as to move the transducer heads 16 radially of the magnetic disks 12 for track to track accessing.

Upon completion of a desired run of data transfer between the magnetic disks 12 and transducer heads 16, the control circuit 50 generates an address signal representative of the head landing track $T_{M+1}$ in accordance with the program introduced into the CPU. The control circuit 50 further computes the difference between the address of the head landing track $T_{M+1}$ and the address of that one of the data storage tracks $T_0$ through $T_M$ on each magnetic disk 12 to which the associated transducer head 16 was in access upon completion of the data transfer. Then the control circuit 50 generates the number of stepping pulses corresponding to the computer difference, for delivery to the control and drive circuit 48. The address of the data storage track that was in data transfer with the transducer head 16 is ascertainable as the head reads the address recorded on that data storage track. The address may be stored in a register, not shown, included in the control circuit 50.

OPERATION

The operation of the above data storage apparatus including the Winchester drive 10 will be best understood by referring to the waveform diagrams of FIGS. 4A through 4C. As the unshown power switch of the apparatus is closed at a moment t0 as in FIG. 4A, the disk drive motor 42 will be set into rotation to start driving the magnetic disks 12 via the drive spindle 14. The rotative speed of the magnetic disks 12 will rise gradually as in FIG. 4B and, at a moment t1, will become 1500 rpm, for example, at which speed the two pairs of transducer heads 16 pneumatically move out of contact with the respective disks 12 against the forces of the support arms 18.

Let it be assumed that each transducer head 16 had been on the head landing track $T_{M+1}$ when the power switch was closed. Then the transducer head 16 will slide over the head landing track from moment t0 to moment t1.

Then, during the period Pa from moment t2 to moment t3, following the moment t1 when all the transducer heads 16 moved out of contact with the magnetic disks 12, the control circuit 50 will produce a calibration signal for moving the floating heads 16 to the outermost data storage tracks $T_0$ on the respective disks 12, as will be understood from FIG. 4C. The control and drive circuit 48 responds to the calibration signal by energizing the stepping motor 28 so as to cause the head transport mechanism 26 to transfer the transducer heads 16 to positions over the outermost data storage tracks $T_0$ on the respective disks 12. Being already out of contact with the magnetic disks 12, the transducer heads 16 will move to the outermost positions without the possibility of damage to the data storage tracks $T_0$ thrugh $T_M$.

During the subsequent period Pb from moment t4 to moment t5, the control circuit 50 will cause the control and drive circuit 48 to energize the stepping motor 28 so as to cause the transducer heads 16 to access desired ones of the data storage tracks $T_0$ through $T_M$.

As the desired run of data transfer comes to an end at the moment t5, the control circuit 50 will internally generate a signal representative of the address of the head landing track $T_{M+1}$ in accordance with the prescribed program and will proceed to compute the difference between the addresses of the head landing track and that one of the data storage tracks over which the transducer heads 16 are located at the moment t5. Then, during the subsequent period Pc from moment t6 to moment t7, the control circuit 50 will deliver to the control and drive circuit 48 that number of stepping pulses which corresponds to the above computed difference. Thus the transducer heads 16 will return to the positions over the head landing tracks $T_{M+1}$ on the respective magnetic disks 12 before a moment t8 when the unshown power switch is opened. The rotative speed of the magnetic disks 12 will gradually decrease thereafter, until the transducer heads 16 land on the head landing tracks $T_{M+1}$ on the respective disks at a moment t9 under the forces of the support arms 18. At any event, the transducer heads 16 should be returned to the positions over the head landing tracks $T_{M+1}$ before the moment t9.

It will have been seen that my invention succeeds in avoiding any undesired contact of the transducer heads 16 with the data storage tracks $T_0$ through $T_M$ on the magnetic disks 12 both at the beginning and end of each run of data transfer. Preferably, the transducer heads 16 should be located on the head landing tracks $T_{M+1}$ at the time of the shipment of the apparatus from its manufacturing plant.

In the above disclosed embodiment, in particular, each magnetic disk 12 has the head landing track $T_{M+1}$ arranged just inwardly of the inmost data storage track $T_M$. The transducer heads 16 can therefore be easily returned to the head landing tracks by energizing the stepping motor 28 with that number of stepping pulses which corresponds to the difference between the head landing tracks and that one of the data storage tracks which the heads accessed for the last time. No modification in existing hardware is required, even no additional signal line between disk drive 10 and control circuit 50.

Although I have shown and described my invention in terms of but one embodiment thereof, I do not wish my invention to be limited by the exact details of that embodiment as a variety of modifications or variations thereof will readily occur to one skilled in the art. For example, it is not essential that the disk drive motor 42 be set into and out of rotation at the same time with the closing or opening of the power switch; instead, as has been known heretofore, the control circuit 50 may be adapted to generate a two level "motor on" signal for controlling the on/off operation of the disk drive motor 42 while the power switch is shown closed. In this case, too, the transducer heads 16 may be returned to the positions over the head landing tracks on the respective magnetic disks while being still held out of contact therewith following the completion of each run of data transfer.

As another possible modification of the illustrated embodiment, the control circuit 50 may not be programmed to cause transfer of the transducer heads 16 to the outermost data storage track (track zero) and to the head landing track at the beginning and end of each run of data transfer, but circuits may be provided for generating signals, for delivery to the control circuit 50, representative respectively of the outermost data storage track and of the head landing track. The control circuit 50 will then respond to such signals for causing the travel of the transducer heads 16 as required by my invention.

It will also be understood that although the illustrated Winchester disk drive has two double sided magnetic disks mounted therein, with a pair of transducer heads arranged on the opposite sides of each disk for data transfer therewith, this arrangement is by way of example only. In its simplest form, the magnetic data storage apparatus in accordance with my invention has but one single sided magnetic disk, with one transducer head arranged on one side thereof for accessing the data storage tracks and head landing track formed only on this side of the disk.

I claim:

1. A magnetic data storage apparatus comprising:

(a) a magnetic disk having data storage tracks and a head landing track formed at least on one face thereof;
(b) a disk drive motor having a drive spindle rigidly coupled to the magnetic disk for impating rotation thereto;
(c) a magnetic transducer head for data transfer with the magnetic disk;
(d) support means for supporting the transducer head so as to bias the same into contact with the magnetic disk when the latter is out of rotation, the transducer head pneumatically moving out of contact with the magnetic disk for data transfer therewith against the bias of the support means when the magnetic disk is set into rotation at more than a predetermined speed;
(e) head transport means for moving the transducer head and the support means relative to the magnetic disk in order to allow the transducer head to access the data storage tracks and head landing track on the magentic disk; and
(f) control means acting on the head transport means so as to cause the same to return the transducer head to a position over the head landing track on the magnetic disk after the moment of completion of each run of data transfer between the magnetic disk and the transducer head and before the moment when the speed of rotation of the magnetic disk falls below the predetermined speed;
(g) whereby the transducer head lands on the head landing track on the magnetic disk under the bias of the support means when the magnetic disk is set out of rotation, and the transducer head slides only over the head landing track when the magnetic disk is in rotation at less than the predetermined speed.

2. The magnetic data storage apparatus as set forth in claim 1, wherein the data storage tracks on the magnetic disk are arranged concentrically with respect to one another, and wherein the head landing track is arranged on the magnetic disk radially inwardly of the data storage tracks in a concentric relationship thereto.

3. A method of operation for a magnetic data storage apparatus wherein a magnetic transducer head is held in contact with a magnetic disk when the latter is out of rotation, the magnetic disk having data storage tracks and a head landing track formed at least on one face thereof, which method comprises:
(a) setting the magnetic disk into rotation at more than a predetermined speed to cause the transducer head to pneumatically move out of contact with the magnetic disk, the transducer head effecting data transfer with the magnetic disk by accessing the data storage tracks thereon while being thus held out of contact with the revolving magnetic disk;
(b) moving, upon completion of the data transfer between the transducer head and the magnetic disk, the transducer head to a position over the head landing track on the magnetic disk while the latter is in rotation at more than the predetermined speed; and
(c) terminating the rotation of the magnetic disk after the transducer head has moved to the position over the head landing track on the magnetic disk, in order to cause the transducer head to land on the head landing track.

4. The method of operation as set forth in claim 3, wherein, when the magnetic disk is set into rotation, the transducer head is moved from a position over the head landing track on the magnetic disk to a position over one of the data storage tracks on the magnetic disk for the commencement of data transfer after the transducer head has moved out of contact with the magnetic disk.

5. A method of operation for a magnetic data storage apparatus wherein a magnetic transducer head is held in contact with a magnetic disk when the latter is out of rotation, the magnetic disk having a series of addressable data storage tracks and head landing track formed concentrically at least on one face thereof, and wherein a head transport mechanism including a stepping motor is provided to move the transducer head substantially radially of the magnetic disk for accessing the data storage tracks and the head landing track, which method comprises:
(a) holding the transducer head landed on the head landing track on the magnetic disk when the latter is out of rotation;
(b) setting the magnetic disk into rotation at more than a predetermined speed to cause the transducer head to pneumatically move out of contact with the head landing track on the magnetic disk;
(c) causing the head transport mechanism to move the transducer head from a position over the head landing track on the magnetic disk to a position over a desired one of the data storage tracks on the magnetic disk for the commencement of data transfer after the transducer head has moved out of contact with the head landing track;
(d) computing, upon completion of the data transfer between the transducer head and the magnetic disk, the difference between the addresses of the head landing track and that one of the data storage tracks over which the transducer head is located upon completion of the data transfer;
(e) returning the transducer head to a position over the head landing track on the magnetic disk while the latter is in rotation at more than the predetermined speed, by energizing the stepping motor of the head transport mechanism with that number of stepping pulses which has been determined by the computation of step (e); and
(c) terminating the rotation of the magnetic disk after the transducer head has moved to the position over the head landing track on the magnetic disk, in order to cause the transducer head to land on the head landing track.

* * * * *